C. E. SCHAEFFER.
STALK CUTTER.
APPLICATION FILED AUG. 25, 1917.
1,268,060.
Patented May 28, 1918.
2 SHEETS—SHEET 2.
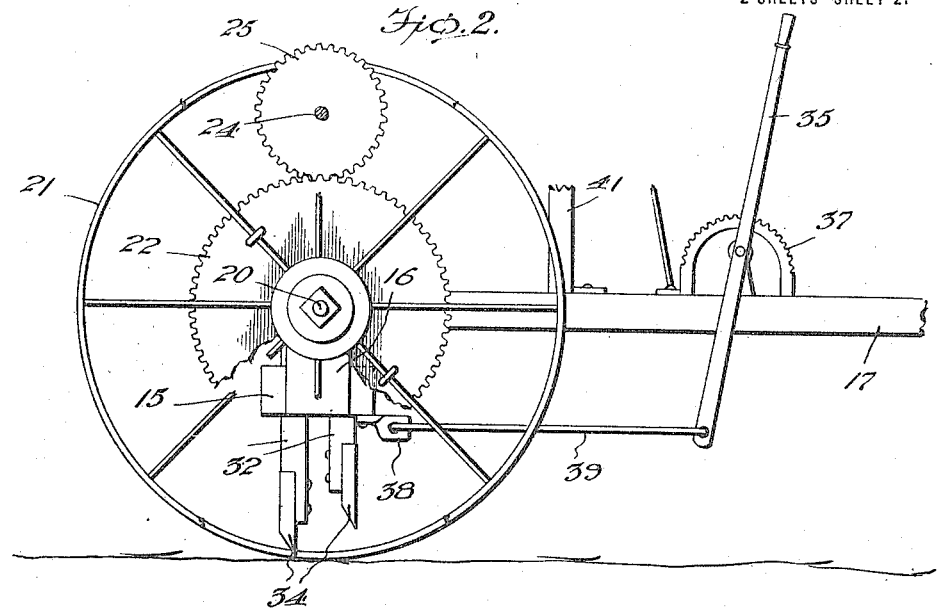
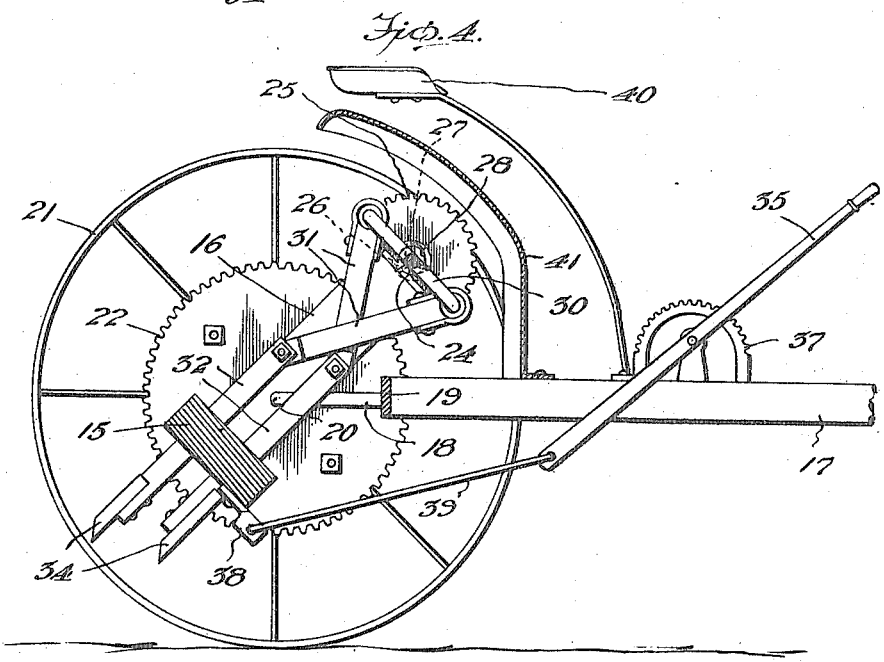
WITNESSES
INVENTOR
C. E. Schaeffer
BY Victor J. Evans
ATTORNEY

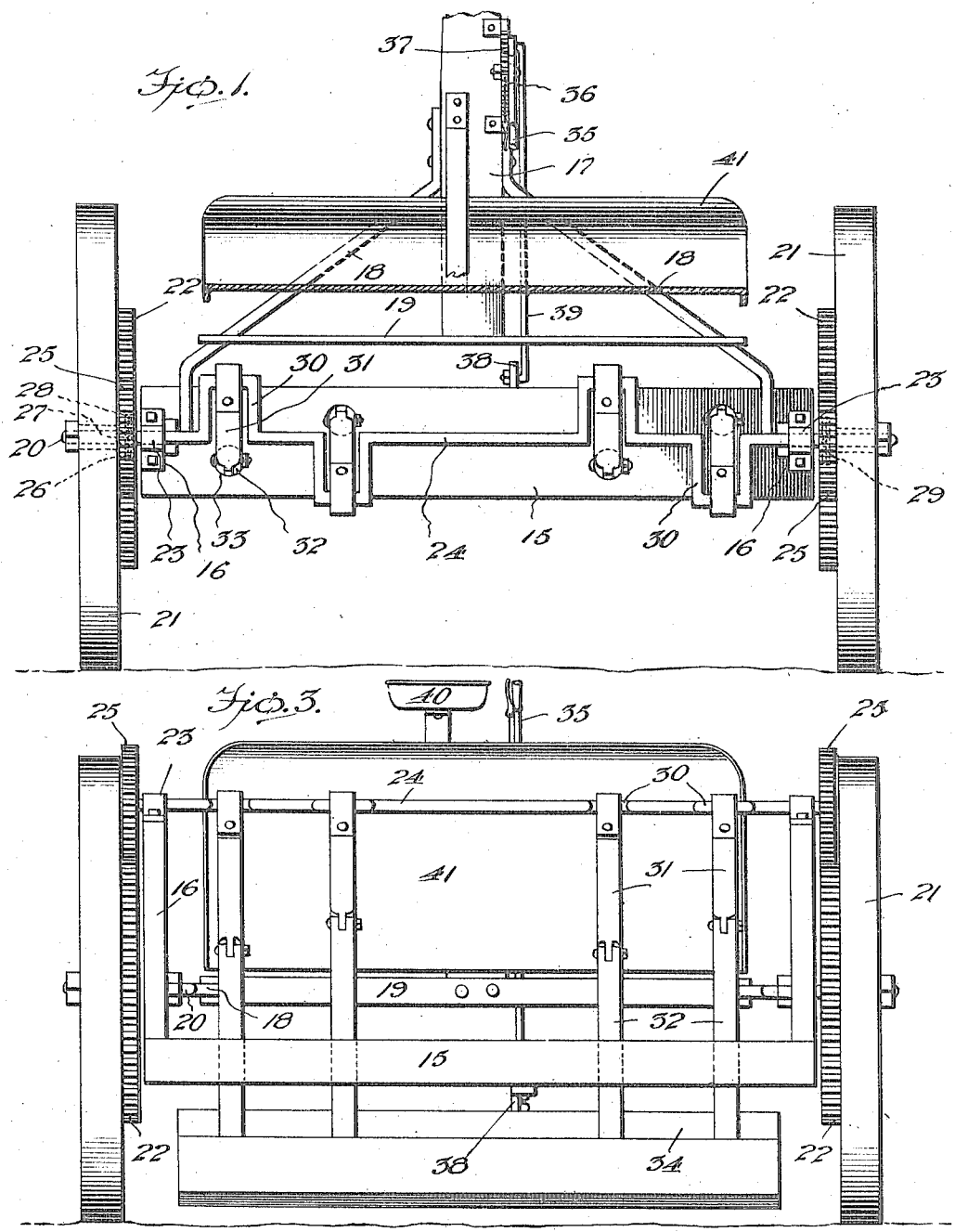

UNITED STATES PATENT OFFICE.

CHARLES E. SCHAEFFER, OF LUCAS, LOUISIANA.

STALK-CUTTER.

1,268,060.　　　　　Specification of Letters Patent.　　Patented May 28, 1918.

Application filed August 25, 1917. Serial No. 188,118.

*To all whom it may concern:*

Be it known that I, CHARLES E. SCHAEFFER, a citizen of the United States, residing at Lucas, in the parish of Caddo and State of Louisiana, have invented new and useful Improvements in Stalk-Cutters, of which the following is a specification.

This invention relates to stalk cutters and it has for its object to produce a simple and improved machine of this class whereby stalks of corn, cotton and other plants may be cut into short pieces suitable for being plowed under without regard to the condition of the stalks whether they be dry and brittle or comparatively green.

A further object of the invention is to produce a machine of the class described whereby the stalks may be cut by a direct up and down movement of the cutting knives in a vertical plane and which by proper adjustment may arrange the knives to operate in an inclined plane, thereby cutting the stalks with a glancing blow.

A further object of the invention is to produce a machine which may be readily adjusted so as to place the knives or cutters in and out of operative engagement with the ground.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a top plan view of the machine constructed in accordance with the invention.

Fig. 2 is a side elevation of the same partly in section.

Fig. 3 is a rear view.

Fig. 4 is a longitudinal sectional view showing the knives tilted to a non-engaging position with respect to the ground.

Corresponding parts in the several figures are denoted by like characters of reference.

The frame of the improved machine comprises a cross bar 15 provided at the ends thereof with uprights 16. The tongue 17 is provided with rearwardly divergent hound members 18, the same being reinforced by a cross bar or brace 19 which may be bolted or otherwise secured on the tongue, the ends of said brace being suitably connected with the hound members. The latter are provided at their rearward ends with spindles 20 that extend through the uprights 16 above the cross bar 15, said uprights being free to rock on the respective spindles. Mounted for rotation on the spindles 20 adjacent to the outer faces of the uprights are ground wheels 21, each having a large spur wheel 22 associated therewith, said spur wheels being located intermediate the uprights 16 and the wheels, on the inner faces of the latter.

The uprights 16 are provided adjacent to their upper ends with boxes or bearings 23 wherein is journaled a shaft 24, said shaft being provided at the ends thereof with pinions 25 that mesh with the spur wheels 22. These spur wheels are connected with the shaft 24 by clutch means of well known construction, the same including pins or dogs 26 that are slidable in apertures 27 in the shaft, said dogs engaging ratchets 28 that are formed internally in recesses 29 in the respective pinions. By this construction, the shaft 24 will continue to rotate when one ground wheel rotates faster than the other or when one of the ground wheels is stationary as is sometimes the case in turning the machine.

The shaft 24 is provided with cranks 30 extending in diametrically opposite directions, there being at least two sets of such cranks. The cranks 30 are connected by pitmen 31 with the upper ends of rods 32 and that operate vertically through openings 33 in the main cross bar 15 of the frame, there being four of such rods two of which are preferably arranged in advance of the remaining two. Securely connected with the lower ends of the rods 32 are the knives or cutters 34, one of said cutters being connected with the rods arranged in advance of their mates, the latter being connected with the other knife. The knives will thus be arranged in substantially parallel relation to each other.

Fulcrumed on the tongue 17 is a hand lever 35 having a stop member 36 engaging a rack segment 37. The main cross bar of the frame is provided with an arm or bracket 38 which is connected by a link 39 with the downwardly extending arm of the lever 35. It will be seen that by proper manipulation of the said lever 35 the cross bar 15 may be tilted so as to cause the knives to operate in an inclined plane, or the said cross bar may when desired be tilted to such an extent as seen in Fig. 4 as to support the knives in non-engaging position with respect to the ground.

A seat 40 may be provided for the driver or operator as well as a fender 41 for protecting the driver.

From the foregoing description taken in connection with the drawings hereto annexed the operation and advantages of this invention will be readily understood. When the machine is drawn over the field motion will be transmitted from the ground wheels to the crank shaft 24 whereby the knives or cutting blades will be reciprocated in a vertical or in an inclined plane according to previous adjustments and the cutters will thus drag down the stalks and cut them into short lengths. The length of the pieces may be regulated by properly proportioning the spur wheel 22 and the pinions 25 and it is calculated that the stalks may be readily cut into pieces not exceeding six inches in length, enabling such pieces to be readily plowed under for the purpose of enriching the soil. The general construction of the machine is very simple and it is obvious that the knives may be made of any desired length to produce a machine of the desired capacity.

What is claimed is:—

In a stalk cutter, a cross bar having a forwardly extending bracket and provided with front and rear rods operating therethrough and having knives at their lower ends, uprights rising from the ends of the cross bar, a tongue having hound members provided with spindles journaled in the uprights, ground wheels mounted for rotation on the spindles, a crank shaft supported for rotation on the uprights, pitmen connecting the cranks of said shaft with the front and rear knife carrying rods, means for transmitting motion from the ground wheels to the crank shaft, a lever fulcrumed on the tongue and having a latch, a rack segment secured on the tongue and engaged by the latch, and a link connecting the lever with the forwardly extending bracket of the cross bar.

In testimony whereof I affix my signature.

CHARLES E. SCHAEFFER.

Copies of this patent may be obtained for five cents each, by addressing the "Commissioner of Patents, Washington, D. C."